May 4, 1954
R. G. VOYSEY
2,677,237
GAS TURBINE POWER PLANT UTILIZING
SOLID WATER-BEARING FUEL
Filed Sept. 10, 1951
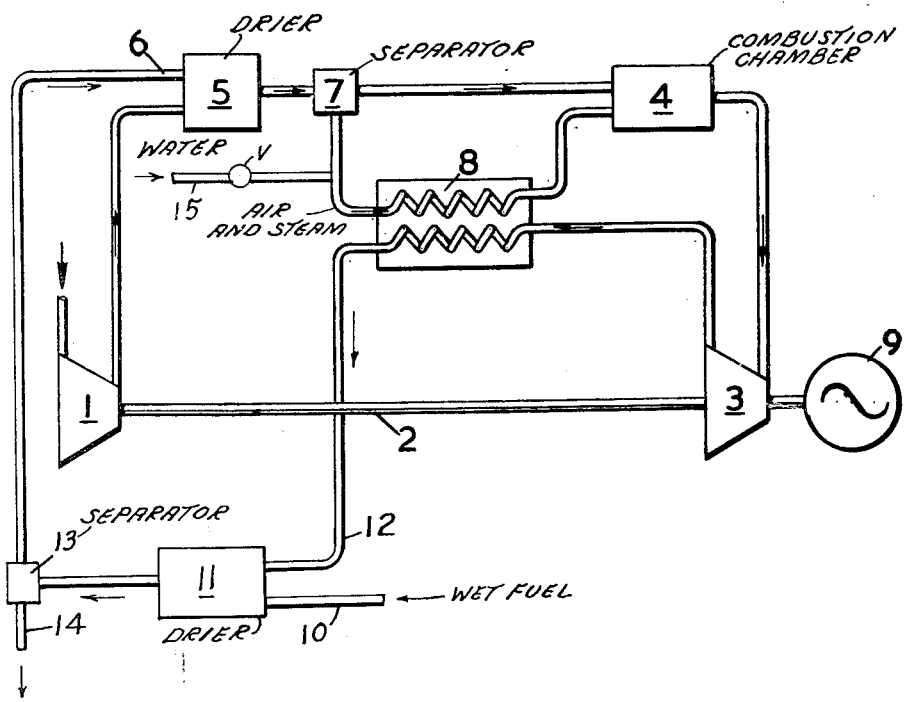
Inventor
Reginald G. Voysey
By
Stevens, Davis, Miller & Mosher
his Attorneys Patented May 4, 1954

2,677,237

UNITED STATES PATENT OFFICE 2,677,237

GAS TURBINE POWER PLANT UTILIZING SOLID WATER-BEARING FUEL

Reginald G. Voysey, Walton-on-Thames, England, assignor to Power Jets (Research and Development) Limited, London, England, a British company Application September 10, 1951, Serial No. 245,941

Claims priority, application Great Britain September 14, 1950

2 Claims. (Cl. 60—39.46)

This invention relates to gas turbine power plants utilising solid water-bearing fuel, and is an improvement or modification of the constructions described in co-pending United States Patent application Serial No. 103,993, filed July 11, 1949 in the name of Campbell H. Secord.

By the term "water-bearing fuel" herein is meant a fuel containing or being otherwise combined with a substantial quantity of water which might amount to as much as ten times its own weight. Such a fuel may for example be bagasse, sewage sludge, coal slurry, sulphite pulp mill waste, town refuse or peat.

As more fully explained in said co-pending application, this type of gas turbine combines the idea of injecting water into the working fluid system with the use of a fuel having a water content such as to render its use normally uneconomic. The use of water injection has the result that, for a designed temperature at the turbine, the quantity of cooling air above that required for complete combustion may be reduced and the size of the plant correspondingly decreased. Such water injection normally requires a large external supply of water but this is obviated in the present case by utilising the water of a water-bearing fuel which might otherwise be useless. This introduction of water will be particularly advantageous if the quantity of water supplied to the working fluid system reaches a maximum amount consistent with a designed maximum temperature at the turbine inlet and a substantially stoichiometric air fuel ratio in the combustion chamber. Water injection under these circumstances will be referred to as "maximum water injection."

Accordingly the invention provides a gas turbine power plant utilising solid water-being fuel comprising a fuel drier to which hot compressed air and said fuel are supplied and in which at least part of the water content of the fuel is evaporated, a combustion chamber receiving said evaporated water content and solid fuel from the drier and a turbine receiving the combustion products and evaporated water content from the combustion chamber.

Preferably the evaporated water content is separated from the solid fuel and is passed through a heat exchanger in which it is heated by the turbine exhaust gases.

A specific embodiment of the invention will now be described by way of example with reference to the accompanying drawing, which is a diagrammatic layout of a gas turbine power plant for driving an alternator.

The plant comprises a compressor 1 connected by a shaft 2 to a turbine 3 which drives it. The compressor 1 delivers hot compressed air through a duct to a fuel drier 5 to which is also delivered water-bearing fuel through an inlet 6. The heat of the compressed air serves to evaporate some or all of the water content of the fuel and the resulting steam together with the air and solid content of the fuel is passed to a separator 7. Here the solid fuel is separated out and led direct to combustion chamber 4 together with a small amount of the air and steam while the greater part of the air and steam is led through one side (hereinafter referred to as the cold side) of a heat exchanger 8 wherein it is heated by the exhaust gases before being passed to combustion chamber 4. The combustion gases pass to turbine 3 which drives alternator 9 and the exhaust gases are discharged through the hot side of heat exchanger 8 to heat the air and steam as already described.

As large a proportion as possible of the air and steam should pass through the heat exchanger, rather than direct to the combustion chamber, so as to obtain the greatest advantage from the heat of the exhaust gases.

The feature of heating the evaporated water content by heat exchange with the turbine exhaust gases forms the subject of co-pending United States Patent Application Serial No. 245,946, filed September 10, 1951, in the name of Campbell H. Secord.

It will be appreciated that the greater the moisture content of the fuel, the greater will become the quantity of air required to evaporate it and the greatest possible moisture content which this cycle will deal with efficiently is one which produces saturation of the compressed air at the inlet to the cold side of the heat exchanger 8, that is, the temperature at this point corresponds to the dewpoint. This gives the maximum temperature difference between the hot and cold sides of the heat exchanger 8.

Thus this cycle is only suitable for comparatively low moisture contents, up to about 75 per cent in the drier, and this moisture content will require air in excess of that required for complete combustion of the order of 400 per cent. Larger moisture contents cannot be dealt with without a loss in efficiency. If desired, the incoming fuel to the drier can be pre-heated and partially dried by means of the exhaust gases after they leave the heat exchanger 8, for example, in the manner described in said co-pending United States Application Serial No. 103,993. The row fuel is led through an inlet 10 into a drier 11 which has a further inlet 12 connected to receive the exhaust gases from the hot side of the heat exchanger 8, and an outlet connected to a separator 13. The hot gases evaporate part of the water content of the fuel in the drier 11, and the resultant steam, the hot gases and the solid fuel are all led to the separator 13. Here the gaseous and solid constituents are separated, the partly dried and preheated solid fuel with its remaining water content being supplied to inlet 6 of the drier 5, and the steam and exhaust gases being discharged at 14. This would make it possible to use raw fuel having a greater moisture content than would otherwise be the case.

In the ideal case the various components of the plant will be designed for a particular set of conditions of air flow, fuel supply, and moisture content of the fuel. In practice it may be necessary to introduce further controls, for instance, additional water might have to be introduced into the system through inlet 15 between the outlet of separator 7 and the inlet to the cold side of heat exchanger 8 to reduce the temperature of the gases at the turbine and at the same time to supplement the mass flow of gases through the cold side of the heat exchanger 8 in the event of the moisture arising from the fuel being temporarily insufficient.

I claim:

1. A gas turbine power plant for utilizing solid water-bearing fuel comprising a source of hot compressed air; a drier having an inlet for said fuel and an outlet; means for supplying said hot compressed air to the drier to evaporate at least part of the water content of the fuel; a separator for separating at least part of said air and evaporated water content from the solid fuel, having an inlet connected to the drier outlet, a first outlet for the solid fuel and a second outlet for the separated air and water content; a combustion chamber having an inlet connected to the first outlet of the separator and an outlet for combustion gases; a turbine having an inlet connected to the combustion chamber outlet and an outlet for exhaust gases; and a heat exchanger of which the cold side has an inlet connected to the second outlet of the separator, and an outlet connected to deliver said air and evaporated water content to the combustion chamber, and the hot side has an inlet connected to the turbine outlet, and an exhaust outlet.

2. Plant according to claim 1 comprising an air compressor constituting said source of hot compressed air.

References Cited in the file of this patent

UNITED STATES PATENTS

| Number | Name | Date |
| --- | --- | --- |
| 1,197,456 | Dinsmore | Sept. 5, 1916 |
| 1,809,819 | Caller | June 16, 1931 |
| 2,032,402 | Colby et al. | Mar. 3, 1936 |
| 2,066,418 | O'Mara | Jan. 5, 1937 |
| 2,148,447 | Dundas et al. | Feb. 28, 1939 |
| 2,171,535 | Berg et al. | Sept. 5, 1939 |

FOREIGN PATENTS

| Number | Country | Date |
| --- | --- | --- |
| 18,329 | Great Britain | Aug. 24, 1904 |
| 166,517 | Great Britain | Sept. 7, 1922 |

OTHER REFERENCES

"Engineering," vol. No. 169, issue No. 4400, May 26, 1950, page 608.